June 19, 1951 — F. A. MELZER — 2,557,751
BORING AND END MILL CUTTER
Filed May 1, 1946
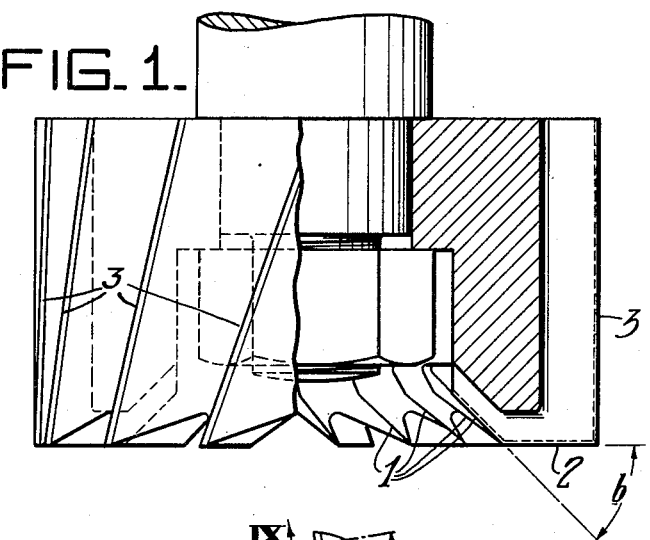
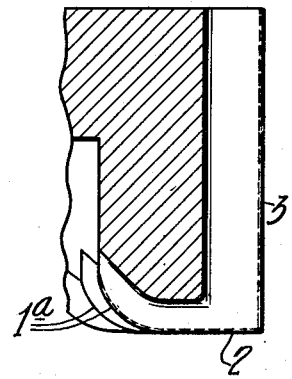
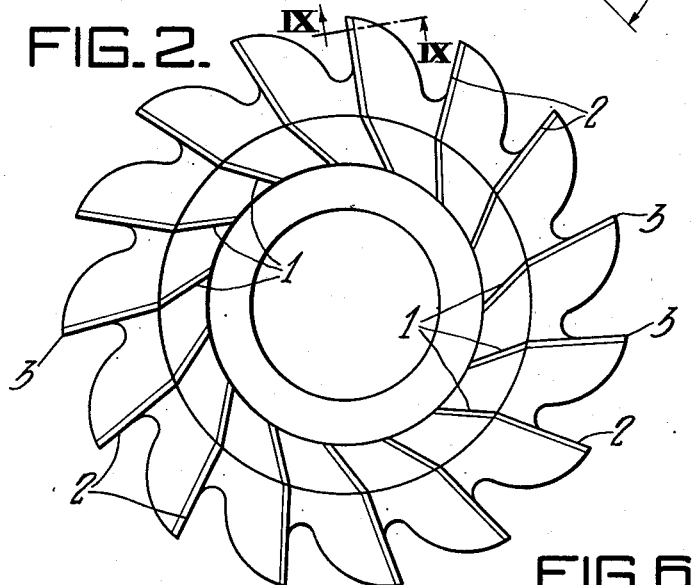
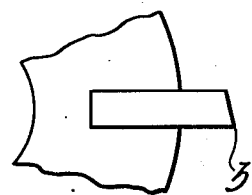
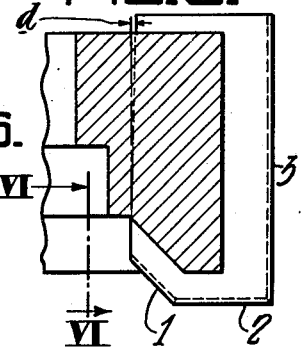
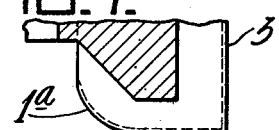
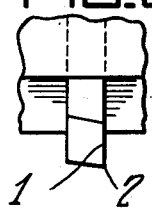
INVENTOR:
FREDERICK A. MELZER,
BY: Donald G. Dalton
HIS ATTORNEY.

Patented June 19, 1951

2,557,751

UNITED STATES PATENT OFFICE 2,557,751

BORING AND END MILL CUTTER

Frederick A. Melzer, Gary, Ind.

Application May 1, 1946, Serial No. 666,325

1 Claim. (Cl. 29—103)

The present invention relates to an improved end milling cutter capable of cutting away a central core which remains when the cutter is first sunk into the work.

Among the objects of the invention are: to provide an end mill cutter which will cut a keyway or a similar recess and remove the core which remains when the cutter is sunk into the metal; to provide an end mill cutter which will leave a smooth even surface at the bottom of the cut; to provide an end mill cutter which can be sunk to the required depth of the recess and cut itself free when caused to travel sideways in any direction; to provide an end mill cutter which can be sunk endwise to a given depth and then be caused to move and cut laterally in one continuous operation.

Heretofore, according to conventional practice, end mill cutters having cutting teeth on both the end and the side of the cutter are counterbored at the center of the end face. When such a counterbored cutter is used for making a lateral cut it is necessary to initially sink the cutter down to a certain depth and since the center of the cutter is recessed a core is left uncut after the cutter has reached the desired depth. To eliminate this core the conventional cutter must be withdrawn to the surface of the work moved laterally to a new position where it can cut into and remove part of the core and the new cut must be to the same depth as the first cut. This procedure must be repeated until the entire core has been removed. In moving the cutter laterally a small triangular section is left uncut on the side of the cut. The cutter must be traversed to the original starting point in order to remove such triangular projections. After the core is removed the teeth on the side of the cutter are free to come into operation and the ultimate cut may then be finished. This method is unsatisfactory in many cases since the keyway or other recess cut has noticeable steps left in the bottom where the core was removed.

With my improved end cutter, constructed and arranged as herein claimed, it is possible to sink the cutter into the work to the desired depth, feed the cutter to move in any directions and leave it at the same depth until the entire cut is finished. In this manner the core at the center of the work is cut away and a smooth surface is obtained in the bottom of the cut.

For a more complete understanding of the invention reference should be made to the following detailed disclosure, the accompanying drawings and the appended claim.

In the drawings—

Figure 1 is a view partly in vertical section and partly in elevation illustrating one embodiment of the invention.

Figure 2 is an inverted plan of Figure 1.

Figure 3 is a fragmentary vertical sectional view illustrating a modification.

Figures 4 and 5 are plan and vertical section of a cutter having inserted teeth embodying the invention.

Figure 6 is a section on line VI—VI of Figure 5.

Figure 7 is a section illustrating a slight modification of Figure 3.

Figure 8 illustrates the manner in which my improved cutter operates to eliminate the core from the work as the cutter is moved laterally in the direction of the arrow.

Figure 9 is a detail section on line IX—IX of Figure 2 showing the clearance angle.

Referring in detail to the drawings, the cutter illustrated is provided with novel inwardly and longitudinally inclined cutting edges designated at 1 and 1a which enable it to cut itself free from a central core $x$ such as shown in Figure 8 when moving laterally in any direction as suggested by the arrow $y$.

The improved cutter includes the usual substantially radial end cutting edges 2, the outer substantially longitudinal cutting edges 3 and the new and improved feature of the inwardly and longitudinally inclined cutting edges which may be either straight from end to end as shown at 1 in Figures 1, 2 and 5 or partly curved as shown at 1a in Figures 3 and 7. Each edge 1 or 1a may be briefly defined as extending obliquely inward from the inner extremity of the end cutting edge 2.

In using an end mill cutter it has been found that the cutter will not cut uniformly from the periphery to the center of the teeth. At the periphery such a cutting edge is traveling at maximum speed and at zero speed at the center or axis of rotation which makes it impossible to secure a uniform cut over its entire length. Such a cutter would be inoperative in practice because the metal at the center, not being cut away, would prevent the cutter from biting into the work. To meet this condition end mill cutters are made with a recessed or counterbored center having cutting edges on the end face extending from the periphery only part way to the center. In this manner the difference in cutting speed at the periphery and the inside end of each cutting tooth is not too great and therefore the teeth effectively cut into and remove the metal. As an end mill cutter of this conventional construction is sunk into the metal an uncut core remains in the center such as illustrated at $x$ in Figure 8.

Where an extended recessed surface has to be cut with a standard cutter and the nature of the cut is such that the cutter cannot enter from the end of the work, it would be necessary to withdraw the cutter to the surface, move it over some distance laterally and again sink the cutter so that a portion of the core would be removed. This process has to be repeated with a conventional cutter until the entire core is removed and before the teeth on the side of the cutter can operate freely to finish the job. The chief object of this invention is to provide means to remove this core.

On the standard conventional cutter the end teeth extend straight across the end face of the cutter whereas the inner cutting edge of teeth 2 in accordance with the present invention are bevelled or obliquely disposed as shown at 1 and 1a to form teeth 1. The bevel angle $b$ of the edges 1 and 1a may vary from 20° to 70° depending upon the nature and depth of the cut. On shallow cuts the angle may be less than in cases where deeper cuts are required. While I do not wish to limit the invention to any specific bevel angle, it will be observed that in most cases a bevel angle $b$ of between 40° and 55° would be preferred. All the cutting edges are preferably relieved as indicated by angle $c$ in Figure 9. Such clearance angles are provided in order that the cutting edge may work without interference and should be just enough to permit the tool to cut freely. A clearance angle $c$, as shown in Figure 9, of from 8° to 10° is regarded as most suitable.

Figure 8 shows a cut made by the improved cutter where only part of the core $x$ has been cut away. In adding the bevelled cutting edge 1 to the conventional cutter there is, in reality, created an entirely new type end mill cutter which is capable of performing a function heretofore not achieved by any prior art end mill cutter. The invention may be applied to the teeth or blades of the inserted tooth type of cutter as shown in Figures 4 to 7. The inserted teeth are seated in grooves of the cutter body and clamped in position by suitable conventional screws not shown. The cutting edges are ground after the blades have been thus secured in place. As shown, in the modification in Figure 5, the inserted teeth of the cutter are formed with a slight taper as indicated by the angle $d$ so that after the cutting edges wear and it is necessary to regrind them the teeth can be adjusted forwardly to compensate for the stock removed in grinding, and maintain the outside diameter of the cutter substantially constant.

While I have shown and described preferred cutter constructions which have been demonstrated by an actual reduction to practice to be highly desirable, it is not to be construed that I am limited thereto since various modifications may be made by those skilled in the art without departure from the invention as defined in the appended claim.

I claim:

An end milling cutter consisting of a continuous hollow ring shell having projecting therefrom a plurality of substantially radial end cutting edges in a plane perpendicular to the axis of rotation of said ring shell, a plurality of outer cutting edges extending lengthwise of the outer periphery of said ring shell, and a plurality of inner cutting edges extending inwardly and longitudinally at an oblique angle to the cutter axis from the inner extremities of said end cutting edges, each of said inner cutting edges not intersecting with any other inner cutting edge at any point, said inner and outer cutting edges being spirally arranged, said inner cutting edges being adapted, when the cutter is moved laterally, to cut away the core left in a workpiece after said end and outer cutting edges have been sunk into the workpiece.

FREDERICK A. MELZER.

REFERENCES CITED

The following references are of record in the file of this patent:

UNITED STATES PATENTS

| Number | Name | Date |
| --- | --- | --- |
| 693,508 | Fette | Feb. 18, 1902 |
| 2,213,498 | Kinzbach | Sept. 3, 1940 |

FOREIGN PATENTS

| Number | Country | Date |
| --- | --- | --- |
| 440,526 | Germany | Mar. 15, 1927 |

OTHER REFERENCES

Meat Cutting Tools, A. L. De Leguw, 1922, McGraw-Hill Book Co., New York, N. Y., pages 142–143.